US008848563B2

(12) United States Patent
Missett et al.

(10) Patent No.: US 8,848,563 B2
(45) Date of Patent: Sep. 30, 2014

(54) SYSTEMS AND METHODS FOR MEASURING FRAME LOSS IN MULTIPOINT NETWORKS

(75) Inventors: Shaun Noel Missett, Avon, CT (US); Berkay Baykal, Westborough, MA (US); Christopher Thomas Bernard, Wayzata, MN (US)

(73) Assignee: Calix, Inc., Petaluma, CA (US)

( * ) Notice: Subject to any disclaimer, the term of this patent is extended or adjusted under 35 U.S.C. 154(b) by 91 days.

(21) Appl. No.: 13/494,176

(22) Filed: Jun. 12, 2012

(65) Prior Publication Data

US 2013/0329580 A1 Dec. 12, 2013

(51) Int. Cl.
H04L 12/26 (2006.01)

(52) U.S. Cl.
USPC .......................................... 370/252; 370/332

(58) Field of Classification Search
CPC ............................... H04W 24/00; H04L 12/18
USPC .................................................. 370/252, 332
See application file for complete search history.

(56) References Cited

U.S. PATENT DOCUMENTS

| 5,450,394 | A | 9/1995 | Gruber et al. |
| 5,793,976 | A | 8/1998 | Chen et al. |
| 6,188,674 | B1 * | 2/2001 | Chen et al. ............. 370/252 |
| 6,538,997 | B1 | 3/2003 | Wang et al. |
| 7,606,203 | B1 * | 10/2009 | Shabtay et al. ............. 370/332 |
| 7,733,794 | B2 | 6/2010 | Damm |
| 2005/0099949 | A1 | 5/2005 | Mohan et al. |
| 2006/0285501 | A1 | 12/2006 | Damm |
| 2010/0039943 | A1 | 2/2010 | Ryoo et al. |
| 2011/0249673 | A1 | 10/2011 | Loon et al. |
| 2012/0236734 | A1 * | 9/2012 | Sampath et al. ............. 370/252 |
| 2012/0311173 | A1 | 12/2012 | Agarwal et al. |
| 2013/0329579 | A1 | 12/2013 | Missed et al. |

OTHER PUBLICATIONS

ITU-T Y.1731, Series Y: Global Information Infrastructure, Internet Protocol Aspects and Next-Generation Networks, Internet protocol aspects—Operation, administration and maintenance, OAM functions and mechanisms for Ethernet based netoworks, ITU-T Recommendation Y.1731, May 2006—including cover page, p. 25-28, p. 34-37 & p. 45-46 (total 11 pages).*

"Liaison to IEEE 802.1 Higher Layer Working Group & ITU-T SG12/Q17, SG13/Q5 and SG15/Q9 from MEF Accurate Frame Loss Ad..", Jul. 24, 2008, pp. 13.

Pearson, "Accurate Frame Loss Ad-hoc Group Findings and Recommendation", Mar. 2008, pp. 114.

(Continued)

Primary Examiner — Albert T Chou
(74) Attorney, Agent, or Firm — Fogg & Powers LLC (57) ABSTRACT

Systems and methods for measuring frame loss in multipoint networks are provided. In one embodiment, a method for calculating frame loss comprises: performing a first continuity check message exchange between a first and a plurality of other devices, the first exchange comprises the first device collecting a first set of frame count data from each of the first and other devices, the first set of frame count data associated with a first instance of time by a first sequence identifier; performing a second continuity check message exchange between the first and plurality of other devices, the second exchange comprises the first device collecting a second set of frame count data from the first other devices, the second set of frame count data associated with a second instance of time by a second sequence identifier; and calculating a frame loss measurement by accounting for frame Ingress and frame Egress.

20 Claims, 7 Drawing Sheets (56) References Cited

OTHER PUBLICATIONS

U.S. Patent and Trademark Office, "Restriction Requirement", "from U.S. Appl. No. 13/494,158", Jan. 9, 2014, pp. 16, Published in: US.

U.S. Patent and Trademark Office, "Office Action", "from U.S. Appl. No. 13/494,158", Apr. 3, 2014, pp. 1-26, Published in: US.

U.S. Patent and Trademark Office, "Final Office Action", "from U.S. Appl. No. 13/494,158", Jul. 25, 2014, pp. 1-23, Published in: US.

* cited by examiner

| Seq.No. | 1 | MEPID | B |
|---|---|---|---|
| ECCM Field | Value | ECCM Field | Value |
| 221 | $URxA_1$ 3040 | 231 | $URxB_1$ 2500 |
| 222 | $BRxA_1$ 1000 | 232 | $BRxB_1$ -- |
| 223 | $MRxA_1$ 1400 | 233 | $MRxB_1$ -- |
| 224 | $UTxA_1$ 4000 | 234 | $UTxB_1$ 2521 |
| 225 | $BTxA_1$ -- | 235 | $BTxB_1$ 0750 |
| 226 | $MTxA_1$ -- | 236 | $MTxB_1$ 2900 |

314 —

| Seq.No. | 1 | MEPID | C |
|---|---|---|---|
| ECCM Field | Value | ECCM Field | Value |
| 221 | $URxA_1$ 3040 | 231 | $URxC_1$ 2500 |
| 222 | $BRxA_1$ 1000 | 232 | $BRxC_1$ -- |
| 223 | $MRxA_1$ 1400 | 233 | $MRxC_1$ -- |
| 224 | $UTxA_1$ 4000 | 234 | $UTxC_1$ 1520 |
| 225 | $BTxA_1$ -- | 235 | $BTxC_1$ 5250 |
| 226 | $MTxA_1$ -- | 236 | $MTxC_1$ 4750 |

312 —

| Seq.No. | 2 | MEPID | B |
|---|---|---|---|
| ECCM Field | Value | ECCM Field | Value |
| 221 | $URxA_2$ 6081 | 231 | $URxB_2$ 5000 |
| 222 | $BRxA_2$ 4500 | 232 | -- |
| 223 | $MRxA_2$ 3500 | 233 | -- |
| 224 | $UTxA_2$ 8000 | 234 | $UTxB_2$ 5042 |
| 225 | $BTxA_2$ -- | 235 | $BTxB_2$ 3000 |
| 226 | $MTxA_2$ -- | 236 | $MTxB_2$ 3900 |

316 —

| Seq.No. | 2 | MEPID | C |
|---|---|---|---|
| ECCM Field | Value | ECCM Field | Value |
| 221 | $URxA_2$ 6081 | 231 | $URxC_2$ 5000 |
| 222 | $BRxA_2$ 4500 | 232 | $BRxC_2$ -- |
| 223 | $MRxA_2$ 3500 | 233 | $MRxC_2$ -- |
| 224 | $UTxA_2$ 8000 | 234 | $UTxC_2$ 3040 |
| 225 | $BTxA_2$ -- | 235 | $BTxC_2$ 6500 |
| 226 | $MTxA_2$ -- | 236 | $MTxC_2$ 3650 |

SYSTEMS AND METHODS FOR MEASURING FRAME LOSS IN MULTIPOINT NETWORKS

CROSS-REFERENCE TO RELATED APPLICATIONS

This application is related to application Ser. No. 13/494,158 filed on even date herewith, entitled "SYSTEMS AND METHODS FOR MEASURING FRAME LOSS IN MULTIPOINT NETWORKS" which is incorporated herein by reference in its entirety.

BACKGROUND

Performance monitoring and fault management functions are currently utilized to test the reliability of packet delivery over E-Line point-to-point Ethernet service. In a point-to-point service, if the Ingress frame count over a period of time for one end point of the E-LINE does not match the Egress frame count at the other end point for that period, there is frame loss. There is presently, however, no standard defined solution for multipoint-to-multipoint E-LAN networks. For such a multipoint service, Unicast frames that ingress at one endpoint can egress at any other endpoint. Additionally, Broadcast and Multicast frames are also present which will ingress at one endpoint and egress at multiple endpoints. It becomes exceedingly difficult to match Ingress and Egress frame counts and to determine where, or if, Frame loss is occurring.

One proposed solution utilizes Synthetic Frame Loss Measurements. This approach assumes that the synthetic frame behavior will be the same as the user frame traffic and uses statistical methods to derive a Frame Loss Ratio over a long period of time.

However, if there are n endpoints in a VLAN there will be $n(n-1)/2$ point to point Loss measurement sessions required to determine a frame loss ratio between each end point. It turns out that in order to support the required accuracy for the statistical methods to reliably detect an error rate of $10^{-6}$ (which is the accepted threshold of reliability for mobile backhaul applications), the Synthetic Frame Loss Measurement method will need to send synthetic loss measurement messages every 100 ms. Therefore a VLAN with 8 endpoints in it will require $8(8-1)/2=28$ sessions and $2(LMM+LMR) \times 10(100 \text{ ms rate}) \times 28(\text{sessions})=560$ messages per second. Since all messages are processed by the host CPU of each NID this requires quite a powerful CPU to handle this task in addition to all the other aspects of managing the NID and this rate must be supported deterministically under all CPU loading conditions.

For the reasons stated above and for other reasons stated below which will become apparent to those skilled in the art upon reading and understanding the specification, there is a need in the art for improved systems and methods for loss measurement in E-LAN configurations.

SUMMARY

The Embodiments of the present invention provide methods and systems for loss measurement in E-LAN configurations and will be understood by reading and studying the following specification.

In one embodiment, a method for calculating frame loss in a multipoint network comprises: performing a first continuity check message exchange between a first network interface device coupled to the multipoint network and a plurality of other network interface devices coupled to the multipoint network, wherein the first continuity check message exchange comprises the first network interface device collecting a first set of frame count data from each of the other network interface devices and the first network interface device, wherein the first set of frame count data is associated with a first instance of time by a first continuity check message sequence identifier; performing a second continuity check message exchange between the first network interface device and the plurality of other network interface devices, wherein the second continuity check message exchange comprises the first network interface device collecting a second set of frame count data from each of the other network interface devices and the first network interface device, wherein the second set of frame count data is associated with a second instance of time by a second continuity check message sequence identifier; and calculating a frame loss measurement for the network by accounting for frame Ingress and frame Egress from the network based on the first set of frame count data and the second set of frame count data.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

The present disclosure describes systems and method for monitoring frame loss within a virtual local area network (VLAN). Embodiments of the present invention utilize specialized messages communicated between VLAN endpoints to collect Ingress and Egress frame count data. For example, in one embodiment, a Y.1731 Standard Continuity Check message is enhanced beyond the Y.1731 Standard to produce what is referred to herein as an enhanced continuity check message (ECCM). By exchanging such continuity check messages as described herein, frame loss measurements for the VLAN can be established.

Figure 1A:
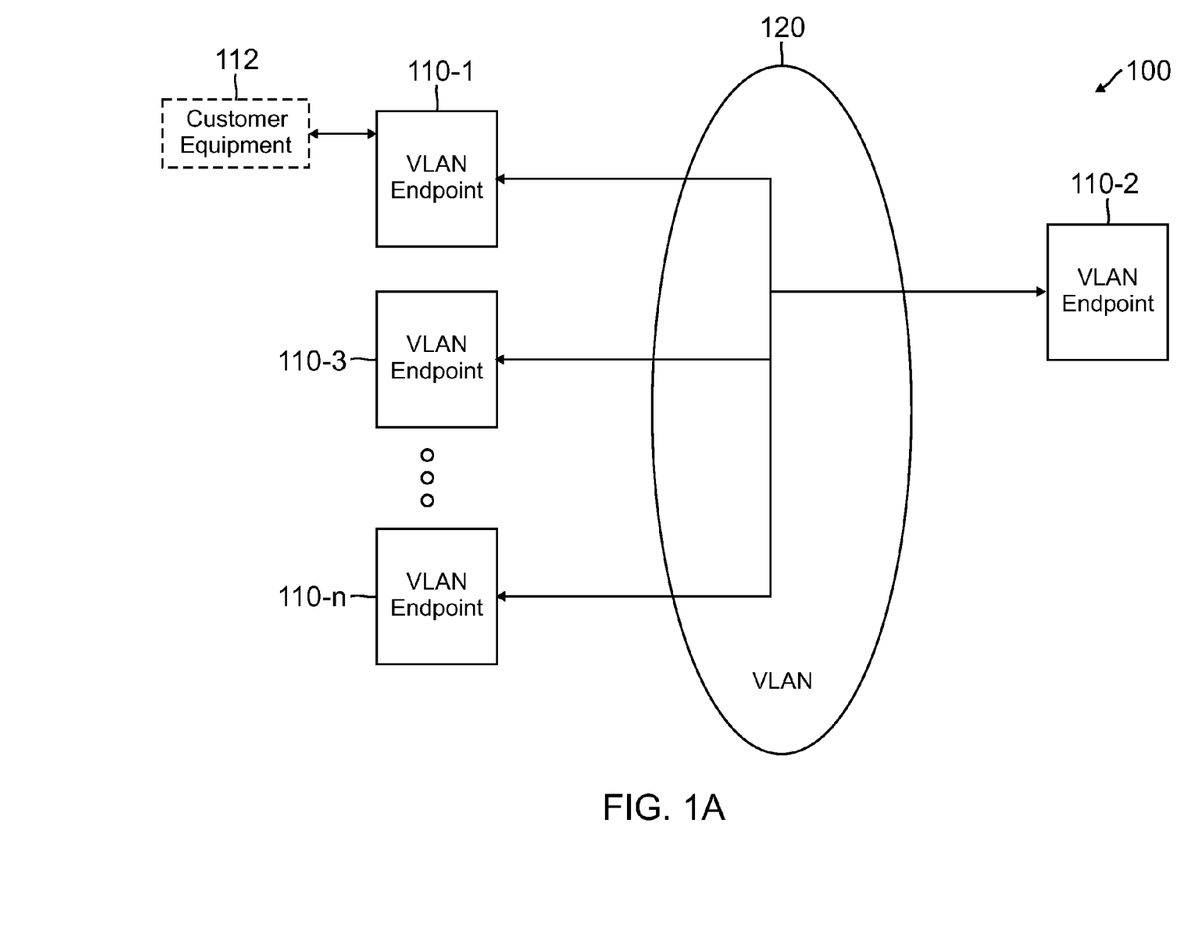
FIGS. 1A and 1B are block diagrams illustrating a multipoint network of one embodiment of the present invention.

FIG. 1 is a diagram illustrating a multipoint network 100 of one embodiment of the present invention. In one implementation, Network 100 comprises an Ethernet network. In other embodiments, other network implementations may be used. Network 100 comprises "n" network interface devices (NIDs) shown at 110-1 to 110-n, where "n" is greater than or equal to 3. Within this application, a VLAN Endpoint on an NID will simply be referred to as a "VLAN Endpoint." Network 100 operates as a multipoint network as opposed to a point-to-point network. VLAN Endpoints 110-1 to 110-n are coupled together by a virtual local area network (VLAN) 120 that interconnects each of the VLAN Endpoints 110-1 to 110-n with every other VLAN Endpoint 110-1 to 110-n. In various implementations, VLAN Endpoints 110-1 to 110-n may include combinations of various network devices such as access nodes, network switches, and routers. In one implementation, an E-LAN service operates over VLAN 120, where at least some of the VLAN Endpoints 110-1 to 110-n map frames from a customer's equipment (customer equipment 112 coupled to VLAN Endpoint 110-1, for example) onto an Ethernet Virtual Connection (EVC). In one embodiment, the EVC may be defined by adding an outer service tag (S-Tag), at a given Priority, onto the user frames and transporting them to at least one destination VLAN Endpoint on network 100. As shown in FIG. 1, VLAN 120 provides an isolated broadcast domain. Therefore, once a steady state for network 100 has been reached (e.g., MAC learning has been completed and Unicast traffic is being forwarded to destinations on VLAN 120 without flooding) frames that Ingress and Egress VLAN 120 may be counted in order to measure frame loss. Each Ingress unicast frame is counted once on Ingress to VLAN 120 and once on Egress from VLAN 120. In the case of Broadcast and Multicast traffic, these frames are counted once on Ingress to VLAN 120 and then once for each Egress from VLAN 120.

Figure 1B:
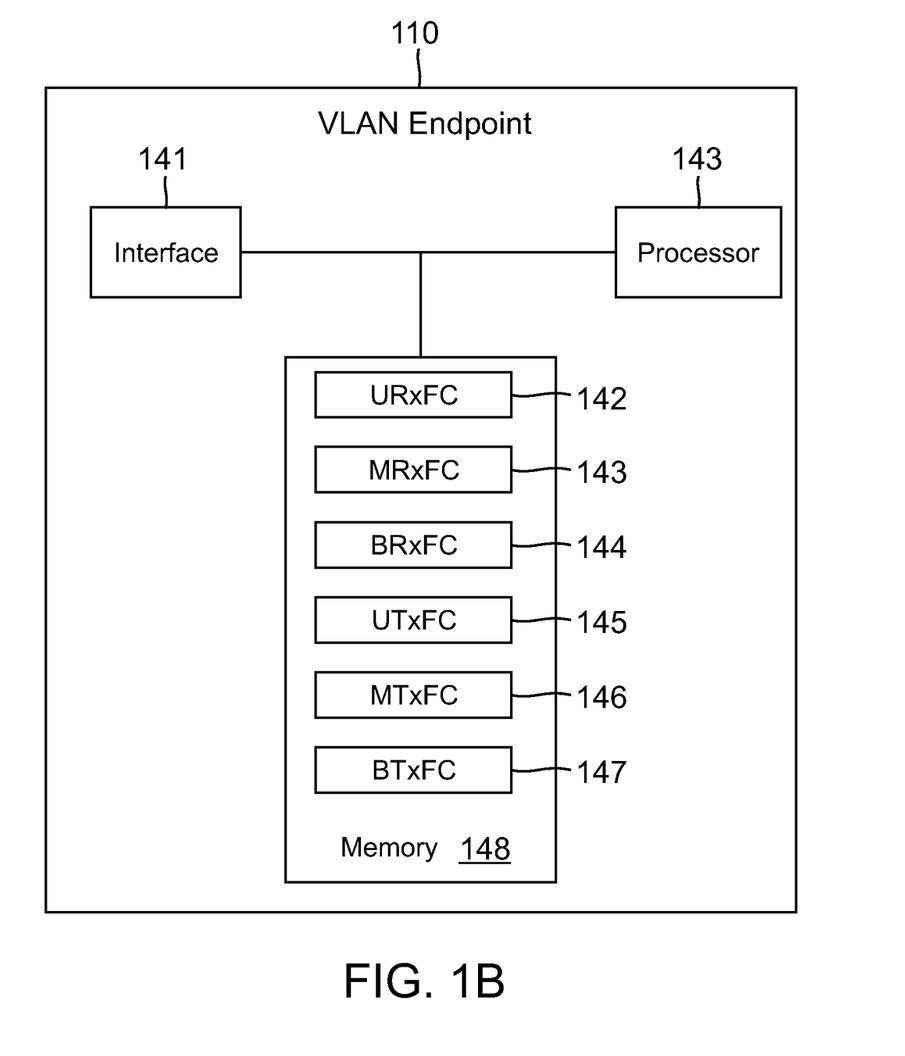

FIG. 1B is a block diagram providing an example of one of the VLAN Endpoints 110-1 to 110-n illustrated in FIG. 1A and referred to generally as VLAN Endpoint 110. VLAN Endpoint 110 comprises a network interface 141 for exchanging framed network traffic that functions to communicatively couple VLAN Endpoint 110 to VLAN 120. VLAN Endpoint 110 further comprises a processor 143 coupled to a memory 148. Memory 148 includes a set of counters 142, 143, 144, 145, 146, 147 that count frames that Ingress into VLAN 120 via interface 141 (that is, frames transmitted by interface 141), and Egress from VLAN 120 via interface 141 (that is, frames received by interface 141). More specifically, Memory 148 includes a received unicast frame counter (URxFC) 142, a received multicast frame counter (MRxFC) 143, a received broadcast frame counter (BRxFC) 144, a transmitted unicast frame counter (UTxFC) 145, a transmitted multicast frame counter (MTxFC) 146, and a transmitted broadcast frame counter (BTxFC) 147. With their respective counters, each VLAN Endpoint 110-1 to 110-n maintains its own frame count for Unicast, Broadcast and Multicast frames transmitted to, and received from VLAN 120.

For example, when VLAN Endpoint 110 transmits a unicast traffic frame to VLAN 120, processor 143 will increase the UTxFC counter 145 frame count by one. When VLAN Endpoint 110 receives a unicast traffic frame from VLAN 120, processor 143 will increase the URxFC counter 142 by one. When VLAN Endpoint 110 transmits a multicast traffic frame to VLAN 120, processor 143 will increase the MTxFC counter 146 frame count by one. When VLAN Endpoint 110 receives a multicast traffic frame from VLAN 120, processor 143 will increase the MRxFC counter 142 by one. Similarly, when VLAN Endpoint 110 transmits a broadcast traffic frame to VLAN 120, processor 143 will increase the BTxFC counter 147 frame count by one. When VLAN Endpoint 110 receives a broadcast traffic frame from VLAN 120, processor 143 will increase the BRxFC counter 144 by one.

With embodiments of the present invention, in order to calculate a measurement of frame loss within VLAN 120, one VLAN Endpoint on VLAN 120 is designated as a "Leader" that collects relevant frame count data from every other VLAN Endpoint (which are designated herein as "Followers"). In one embodiment, each VLAN Endpoint 110-1 to 110-n is assigned an MEPID which serves to uniquely identify each respective VLAN Endpoint. In one implementation, the VLAN Endpoint on VLAN 120 that has the lowest value MEPID is designated as the "Leader" for performing frame loss measurements. These measurements can be initiated upon network 100 initialization after any outstanding continuity check alarms for VLAN 120 are cleared. For the purpose of illustration, VLAN Endpoint 110-1 will be the designated leader endpoint and while VLAN Endpoints 110-2 to 110-n will function as follower endpoints.

Figure 2:
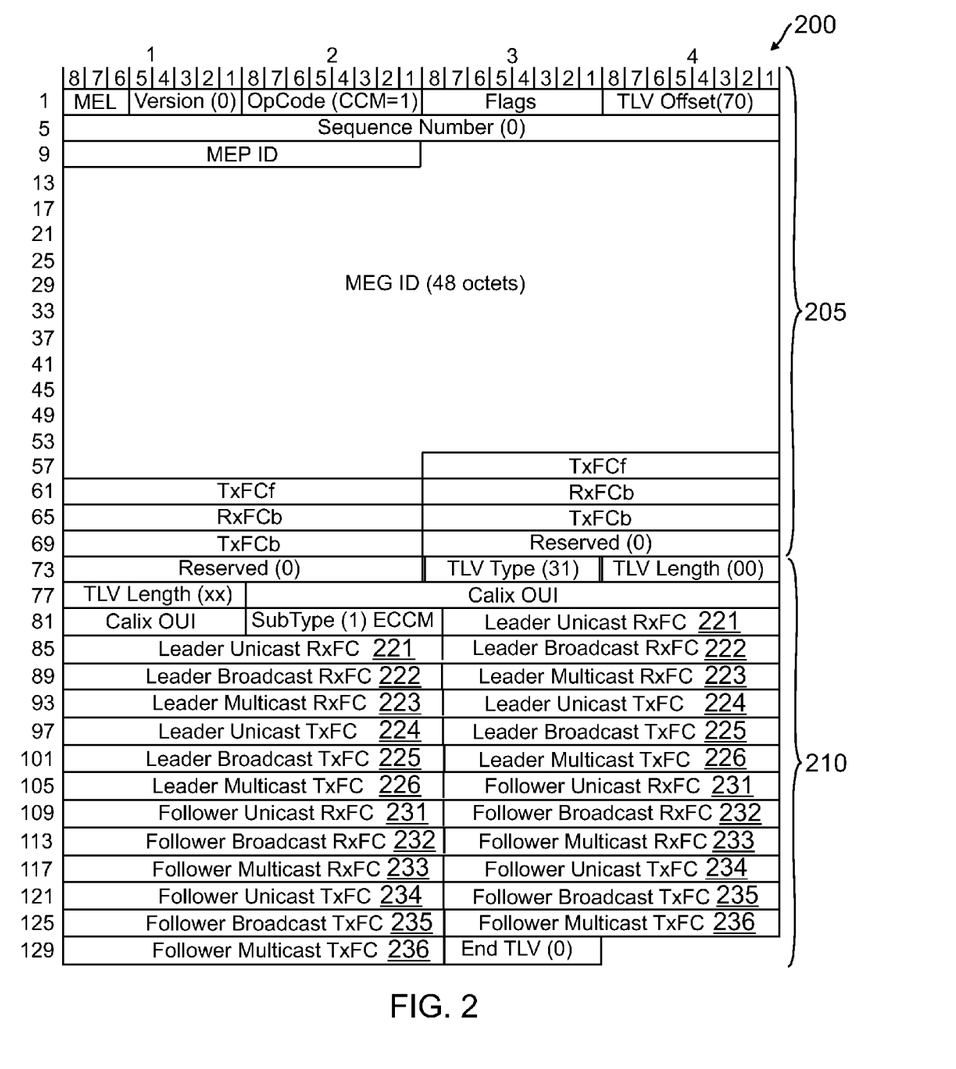
FIG. 2 is a diagram illustrating an enhanced continuity check message one embodiment of the present invention.

In one embodiment, frame count data collection is achieved by the Leader VLAN Endpoint 110-1 through the exchange of enhanced continuity check messages between leader VLAN Endpoint 110-1 and follower VLAN Endpoints 110-2 to 110-n. FIG. 2 illustrates an enhanced continuity check message (ECCM) 200 of one such embodiment of the present invention. The ECCM 200 shown in FIG. 2 is based the Y.1731 Standard Continuity Check message for Dual Ended Loss Measurement, but further enhanced by adding an E-LAN PM TLV (Type-Length-Value) element 210 to the standard continuity check message 205. That is, as shown in FIG. 2, the first 74 eight-bit words of ECCM 200 are the same as those defined for a Y.1731 Standard Continuity Check message. PM TLV element 210 defines and reserves additional fields within ECCM 200 that enable the leader VLAN Endpoint 110-1 to collect frame count data from followers VLAN Endpoints 110-2 to 110-n.

In one embodiment, in operation, after network 100 is initialized, frame loss measurement commences when the leader VLAN Endpoint 110-1 broadcasts ECCM 200 to followers VLAN Endpoints 110-2 to 110-n. Each ECCM 200 transmitted by the leader VLAN Endpoint 110-1 includes a sequence number, which is incremented for each subsequent ECCM 200 transmitted by leader 110-1. In one embodiment, the first ECCM 200 transmitted by VLAN Endpoint 110-1 starts with the sequence number zero. From its own counters 142-146, the leader VLAN Endpoint 110-1 inserts frame count data into the corresponding leader frame count data fields 221 to 226 of the TVL 210 as they exist at the instance the ECCM 200 is transmitted. This is illustrated in the table below.

| Leader VLAN Endpoint Counter → | Corresponding ECCM 200 Frame Count Field |
|---|---|
| URxFC 142 → | Leader Unicast RxFC 221 |
| MRxFC 142 → | Leader Multicast RxFC 223 |
| BRxFC 143 → | Leader Broadcast RxFC 222 |
| UTxFC 145 → | Leader Unicast TxFC 224 |
| MTxFC 146 → | Leader Multicast TxFC 226 |
| BTxFC 146 → | Leader Broadcast TxFC 225 |

When each of the followers VLAN Endpoints 110-2 to 110-n receives ECCM 200, they will produce a completed ECCM 200 by inserting their own MEPID and frame count data from their own counters 142-146 into the corresponding follower frame count data fields 231-236 of the TVL 210 as they exist at the instant the ECCM 200 is received from leader VLAN Endpoint 110-1. This is illustrated in the table below.

| Follower VLAN Endpoint Counter → | Corresponding ECCM 200 Frame Count Field |
|---|---|
| URxFC 142 → | Follower Unicast RxFC 231 |
| MRxFC 142 → | Follower Multicast RxFC 233 |
| BRxFC 143 → | Follower Broadcast RxFC 232 |
| UTxFC 145 → | Follower Unicast TxFC 234 |
| MTxFC 146 → | Follower Multicast TxFC 236 |
| BTxFC 146 → | Follower Broadcast TxFC 235 |

That is each follower VLAN Endpoint 110-2 to 110-*n* will generate an ECCM 200 message having the same sequence number as the last ECCM 200 message receive from the Leader VLAN Endpoint 110-1 and that includes all the leader frame count data in fields 221-225 as received from the Leader VLAN Endpoint 110-1. The follower VLAN Endpoint's ECCM 200 will also include its own frame count data inserted into fields 231-235. The follower VLAN Endpoints 110-2 to 110-*n* will then transmit their completed ECCM 200 message to leader VLAN Endpoint 110-1 for their next scheduled continuity check message transmission.

For the particular ECCM 200 shown in FIG. 2, each of the frame count information field 221-226 and 231-236 may store up to a thirty-two bit counter value. This should not be considered as limiting. In other implementations, other bit-lengths may be used.

Leader VLAN Endpoint 110-1 will thus receive all completed ECCM 200 responses from every other VLAN Endpoint 110-2 to 110-*n* on VLAN 120 and collect the frame count data from their respective counters 142-147. Using this information, Leader VLAN Endpoint 110-1's processor 143 can implement one or more algorithms to calculate frame loss measurements and statistics for all sent and received frames transported through VLAN 120. In one embodiment, each time a set of completed ECCM messages are received back at leader VLAN Endpoint 110-1, processor 143 performs a current loss calculation for each frame type by comparing a current sampling of frame count data to a previous sampling of frame count data. An arbitrary number of previous samples may be maintained. In one embodiment, previous calculations will be maintained in memory 148 as previous loss calculation values.

In the case of Unicast traffic, there should be a one-to-one correspondence for frames entering VLAN 120 and frames leaving VLAN 120. That is, absent frame loss, the sum of all Unicast traffic which Ingresses the VLAN 120 and all Unicast traffic which Egresses the VLAN 120 should match. In one embodiment, a frame loss measurement calculation referred to as the Frame Loss Ratio, may be performed by Leader VLAN Endpoint 110-1 by summing all the Ingress Frame Counts for Unicast frames for a given ECCM 200 sequence number S, call this $I_S$, and summing all Egress Frame Counts for Unicast frames at the given ECCM 200 sequence number S, call this $E_S$. The Frame Loss Ratio (FLR) Performance can be expressed mathematically as follows:

$$FLR_S = \begin{cases} \left(\frac{I_S - E_S}{I_S}\right) \times 100 & \text{if } I_S \geq 1 \\ 0 & \text{otherwise.} \end{cases}$$

In another embodiment, a frame loss measurement referred to as a frames loss count, is calculated by the leader 110-1 processor 143 for Unicast frames as follows. For a current ECCM 200 sequence (sequence "c"), processor 143 retrieves all follower frame count data (URxFC) from field 231 from all the ECCM 200 messages received back from follower VLAN Endpoints 110-2 to 110-*n* and the leader unicast frame count data from field 231. Similarly, processor retrieves all follower frame count data (UTxFC) from field 234 from all the ECCM 200 messages received back from follower VLAN Endpoints 110-2 to 110-*n* and the leader unicast frame count data from field 224. Processor 143 also retrieves the same frame count data for a previous ECCM 200 sequence (sequence "p"). A total count for Unicast Frame Ingress may be calculated from the difference between the sum of Ingress frame counts as shown by ECCM 200 sequence "c" and the sum of Ingress frame counts as shown by ECCM 200 sequence "p".

For example, in one embodiment, processor 143 sums all follower frame count data (URxFC) from field 231 from all the sequence "c" ECCM 200 messages received back from follower VLAN Endpoints 110-2 to 110-*n* with the leader unicast frame count data from field 231. The processor also sums all follower frame count data (URxFC) from field 231 from all the sequence "p" ECCM 200 messages received back from follower VLAN Endpoints 110-2 to 110-*n* with the leader unicast frame count data from field 231. The difference between the sequence "c" frame count sum and the sequence "p" frame count sum is the total count for Unicast Frame Ingress.

Similarly, processor 143 sums all follower frame count data (UTxFC) from field 234 from all the sequence "c" ECCM 200 messages received back from follower VLAN Endpoints 110-2 to 110-*n* with the leader unicast frame count data from field 224. The processor also sums all follower frame count data (UTxFC) from field 234 from all the sequence "p" ECCM 200 messages received back from follower VLAN Endpoints 110-2 to 110-*n* with the leader unicast frame count data from field 224. The difference between this sequence "c" frame count sum and sequence "p" frame count sum is the total count for Unicast Frame Egress.

The Unicast Frame Loss as determined from the sequence "c" and sequence "p" ECCM messages is calculated from the difference between the "Unicast Frame Ingress" and the "Unicast Frame Egress". As would be appreciated by one of ordinary skill in the art upon studying this specification, in real-life applications there will be variations in the transmission rate of frames between each of the VLAN Endpoints 110-1 to 110-*n*. There is not an instantaneous transmission of the leader VLAN Endpoint 110-1's ECCM 200 to the follower VLAN Endpoints 110-2 to 110-*n*. That is, it takes some time from the moment of transmission for an ECCM 200 transmitted by leader VLAN Endpoint 110-1 to reach the follower VLAN Endpoints 110-2 to 110-*n*. In that time additional frames may ingress or egress VLAN 120 from any of the VLAN Endpoints 110-1 to 110-*n*. As such, the data collected across VLAN 120 as captured by any one ECCM 200 exchange sequence will not be completely accurate. However, as frame count data is subsequently collected over successive sequences, the frame loss value calculated by processor 143 will converge on an increasingly more accurate value. In one embodiment, leader VLAN Endpoint 110-1 can re-initialize (i.e., re-zero) frame counters 142-147 across all VLAN Endpoints 110-1 to 110-*n* by transmitting an ECCM 200 with an sequence number of zero.

Figure 3A:
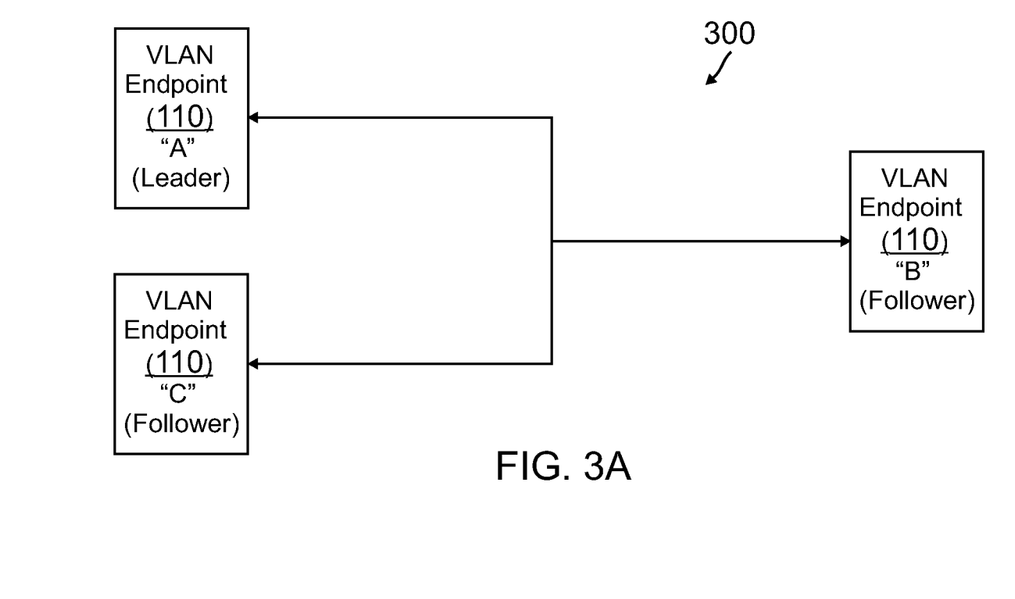
FIGS. 3A and 3B are diagrams illustrating one embodiment of the present invention in operation.
Figure 3B:
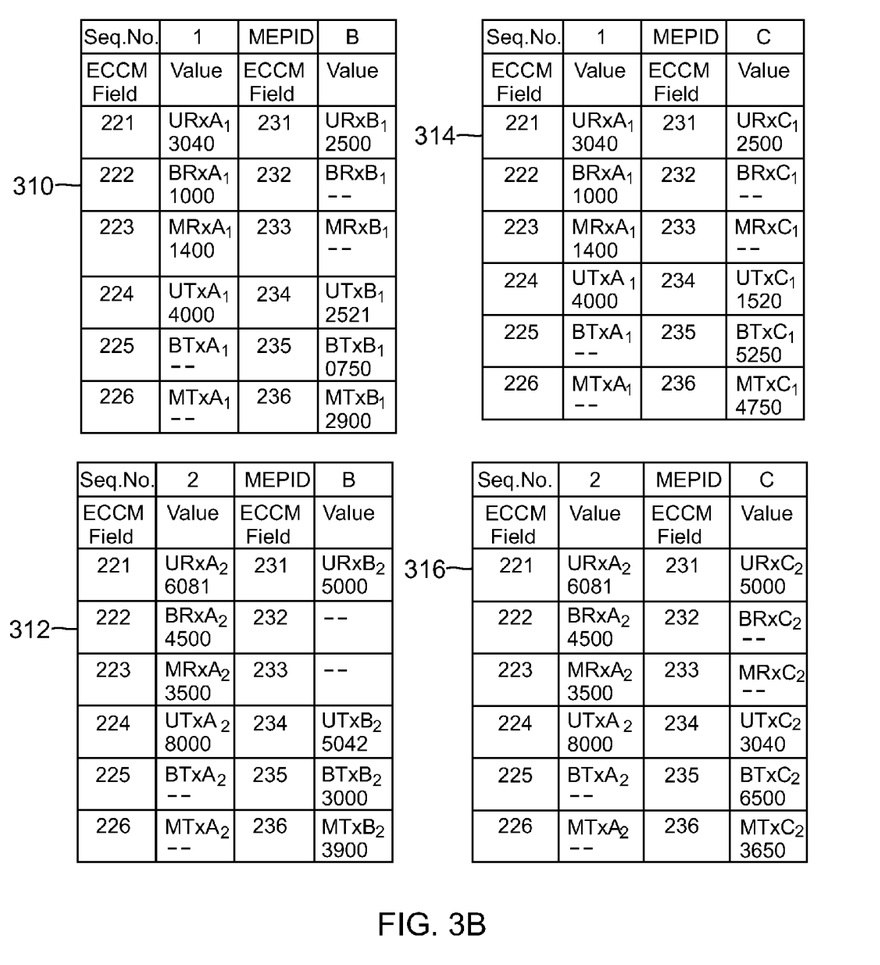

A numerical example of the calculation described above may be presented for a three VLAN Endpoint network 300 as shown in FIG. 3A and using the frame count data illustrated in FIG. 3B. In one embodiment, network 300 is an implementation of network 100 shown in FIG. 1 and each VLAN Endpoint functions as described with respect to VLAN Endpoint 110 in FIG. 1B. In this example, the leader VLAN Endpoint is designate VLAN Endpoint "A" and follower VLAN Endpoints are "B" and "C". Also for this example, an exchange of ECCM messages of sequence number "1" and sequence number "2" has already been completed and the completed ECCM messages shown in FIG. 3B have been received by VLAN Endpoint "A". FIG. 3B illustrates at 310 data from a sequence No. 1 ECCM received by VLAN Endpoint "A" from follower VLAN Endpoint "B" and at 312, a sequence No. 2 ECCM received by VLAN Endpoint "A" from follower VLAN Endpoint "B". FIG. 3B illustrates at 314 a sequence No. 1 ECCM received by VLAN Endpoint "A" from follower VLAN Endpoint "c" and at 316, a sequence No. 2 ECCM received by VLAN Endpoint "A" from follower VLAN Endpoint "C". Given the two samples of frame count data from leader VLAN Endpoint "A" and followers VLAN Endpoints "B" and "C", the Leader VLAN Endpoint "A" can now calculate frame loss for the VLAN implemented by network 300.

In one embodiment, total unicast ingress frames may be determined from the expressions $$\text{Ingress Frames} = \Sigma(UTxA_2, UTxB_2, UTxC_2) - \Sigma(UTxA_1, UTxB_1, UTxC_1), \text{ or}$$

$$\text{Ingress Frames} = (UTxA_2 - UTxA_1) + (UTxB_2 - UTxB_1) + (UTxC_2 - UTxC_1)$$

where $UTxA_1$ is the Unicast transmit frame count for VLAN Endpoint A for sequence No. 1, $UTxA_2$ is the Unicast transmit frame count for VLAN Endpoint A for sequence No. 2, $UTxB_1$ is the Unicast transmit frame count for VLAN Endpoint B for sequence No. 1, $UTxB_2$ is the Unicast transmit frame count for VLAN Endpoint B for sequence No. 2, $UTxC_1$ is the Unicast transmit frame count for VLAN Endpoint C for sequence No. 1, $UTxC_2$ is the Unicast transmit frame count for VLAN Endpoint C for sequence No. 2. For the values provided in FIG. 3B, $$\text{Ingress Frames} = (8000 - 4000) + (5042 - 2521) + (3040 - 1520) = 8041$$

Total unicast egress frames may be determined from the expressions $$\text{Egress Frames} = \Sigma(URxA_2, URxB_2, URxC_2) - \Sigma(URxA_1, URxB_1, URxC_1), \text{ or}$$

$$\text{Egress Frames} = (URxA_2 - URxA_1) + (URxB_2 - URxB_1) + (URxC_2 - URxC_1)$$

where $URxA_1$ is the Unicast receive frame count for VLAN Endpoint A for sequence No. 1, $URxA_2$ is the Unicast receive frame count for VLAN Endpoint A for sequence No. 2, $URxB_1$ is the Unicast receive frame count for VLAN Endpoint B for sequence No. 1, $URxB_2$ is the Unicast receive frame count for VLAN Endpoint B for sequence No. 2, $URxC_1$ is the Unicast receive frame count for VLAN Endpoint C for sequence No. 1, $URxC_2$ is the Unicast receive frame count for VLAN Endpoint C for sequence No. 2. For the values provided in FIG. 3B, $$\text{Egress Frames} = (6081 - 3040) + (5000 - 2500) + (5000 - 2500) = 8041$$

An estimated frame loss measurement based on the frame count samples in sequence No. 1 and sequence No. 2 is determined by:

$$\text{Unicast Frame Loss} = \text{Ingress Frames} - \text{Egress Frames}$$

For the valued provided in FIG. 3B, $$\text{Unicast Frame Loss} = 8041 - 8041 = 0$$

Frame loss measurement calculations for Broadcast and Multicast traffic for network 100 is treated slightly differently. Since each VLAN Endpoint 110-1 to 110-n in VLAN 120 can count its' own Ingress Broadcast and Multicast traffic, a frame loss calculation can utilize the fact that all other VLAN Endpoints on VLAN 120 should receive all Broadcast and Multicast frames from the other VLAN Endpoints. Therefore, in the absence of frame loss, a count of all broadcast (or Multicast) frames received by any given VLAN Endpoint should be equal to the sum of all Broadcast (or Multicast) frames transmitted by all other VLAN Endpoints.

For example, referring back to FIGS. 3A and 3B, a frame loss for broadcast frames may be determined from the total number of broadcast frame received at a first node (VLAN Endpoint A, for example) subtracted from the total number of all broadcast frames transmitted by all other nodes (i.e., VLAN Endpoints B & C). This is equivalent to the expressions:

$$\text{Broadcast Frame Loss} = [\Sigma(BTxB_2, BTxC_2) - \Sigma(BTxB_1, BTxC_1)] - (BRxA_2 - BRxA_1), \text{ or}$$

$$\text{Broadcast Frame Loss} = [(BTxB_2 - BTxB_1) + (BTxC_2 - BTxC_1)] - (BRxA_2 - BRxA_1)$$

where $BRxA_1$ is the broadcast receive frame count for VLAN Endpoint A for sequence No. 1, $BRxA_2$ is the broadcast receive frame count for VLAN Endpoint A for sequence No. 2, $BTxB_1$ is the broadcast transmit frame count for VLAN Endpoint B for sequence No. 1, $BTxB_2$ is the broadcast transmit frame count for VLAN Endpoint B for sequence No. 2, $BTxC_1$ is the broadcast transmit frame count for VLAN Endpoint C for sequence No. 1, $BTxC_2$ is the broadcast transmit frame count for VLAN Endpoint C for sequence No. 2. For the values provided in FIG. 3B, $$\text{Broadcast Frame Loss} = [(3000 - 0750) + (6500 - 5250)] - (4500 - 1000) = 0$$

Similarly, a frame loss for multicast frames may be determined from the total number of multicast frame received at a first node (VLAN Endpoint A, for example) subtracted from the total number of all multicast frames transmitted by all other nodes (i.e., VLAN Endpoints B & C). This is equivalent to the expressions:

$$\text{Multicast Frame Loss} = [\Sigma(MTxB_2, MTxC_2) - \Sigma(MTxB_1, MTxC_1)] - (MRxA_2 - MRxA_1), \text{ or}$$

$$\text{Multicast Frame Loss} = [(MTxB_2 - MTxB_1) + (MTxC_2 - MTxC_1)] - (MRxA_2 - MRxA_1)$$

where $MRxA_1$ is the multicast receive frame count for VLAN Endpoint A for sequence No. 1, $MRxA_2$ is the multicast receive frame count for VLAN Endpoint A for sequence No. 2, $MTxB_1$ is the multicast transmit frame count for VLAN Endpoint B for sequence No. 1, $MTxB_2$ is the multicast transmit frame count for VLAN Endpoint B for sequence No. 2, $MTxC_1$ is the multicast transmit frame count for VLAN Endpoint C for sequence No. 1, $MTxC_2$ is the multicast transmit frame count for VLAN Endpoint C for sequence No. 2. For the values provided in FIG. 3B, $$\text{Multicast Frame Loss} = [(3900 - 2900) + (4750 - 3650)] - (3500 - 1400) = 0$$

Figure 4A:
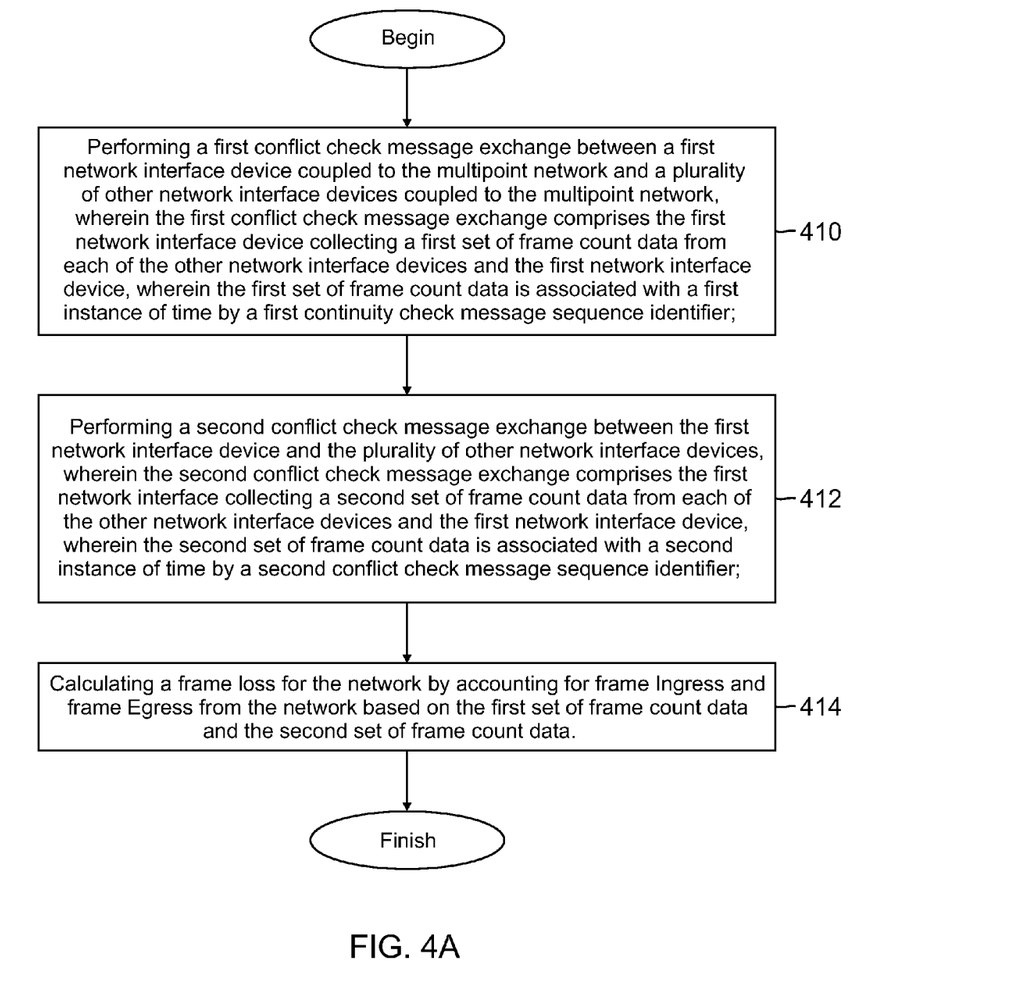
FIGS. 4A and 4B illustrate a method of one embodiment of the present invention.
Figure 4B:
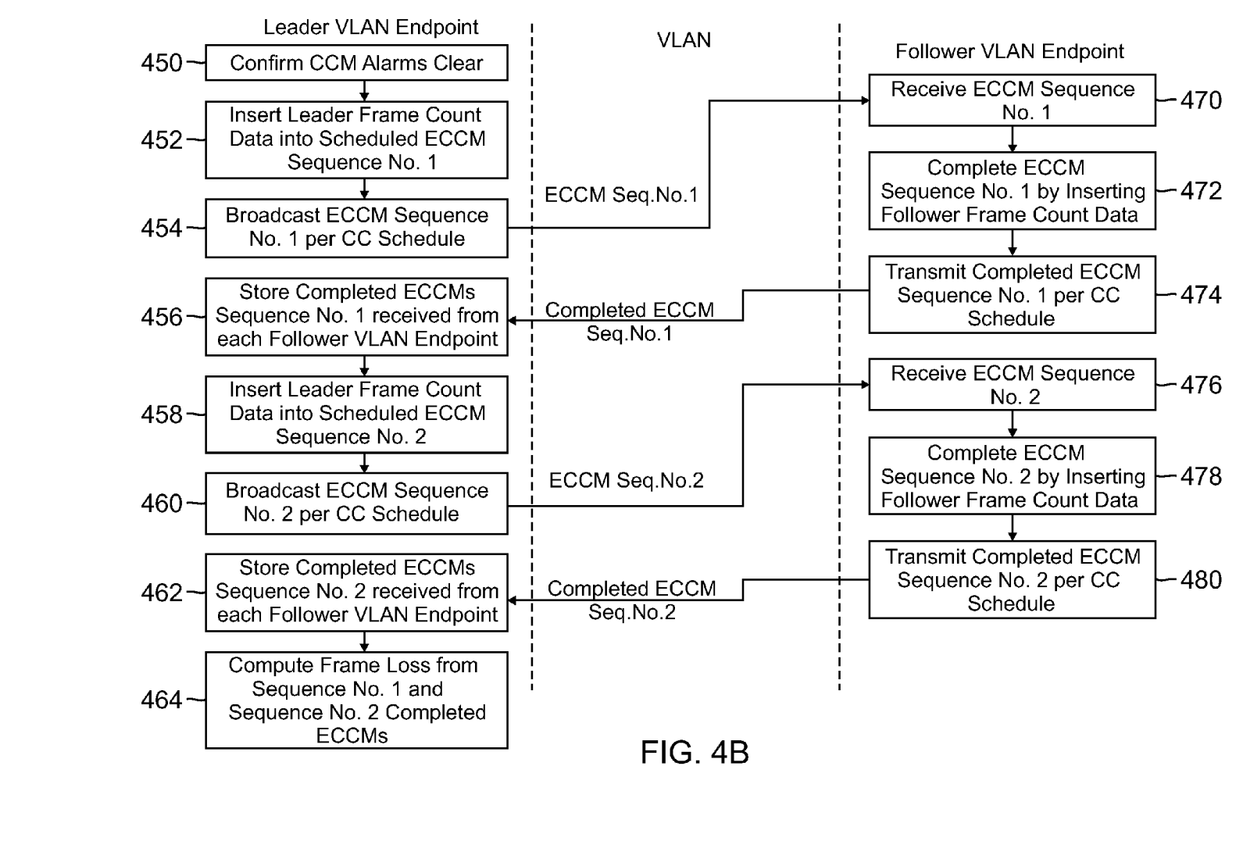

FIGS. 4A and 4B respectively provide a flow chart and message flow diagram for a method of one embodiment of the present invention for calculating frame loss measurements in a multipoint network such as any described embodiment. The method begins at 410 with performing a first continuity check message exchange between a first network interface device (i.e., a VLAN Endpoint) coupled to the multipoint network and a plurality of other network interface devices coupled to the multipoint network. The first continuity check message exchange comprises the first network interface device collecting a first set of frame count data from each of the other network interface devices and the first network interface device. The first set of frame count data is associated with a first instance of time by a first continuity check message sequence identifier. For example, Referring to FIG. 4B, after the leader VLAN Endpoint confirms that any outstanding continuity check alarms have been cleared (block 450), the leader VLAN Endpoint will generate an Enhanced Continuity check Message (block 452) and populate the Enhanced Continuity check Message with frame count data from its own frame counters. This is performed immediately prior to broadcasting the Enhanced Continuity check Message to the follower nodes over the VLAN (block 454). In one embodiment, the VLAN utilizes a continuity check schedule so that ECCM messages for the VLAN are transmitted at intervals determined by that schedule. For each exchange of Enhanced Continuity check Messages, the messages are stamped with a sequence number that is incremented for each exchange. Upon receiving the Enhanced Continuity check Message (block 470), a follower VLAN Endpoint will complete the Enhanced Continuity check Message with frame count data from its own frame counters (block 472). This is performed immediately upon receiving the Enhanced Continuity check Message to ensure that the frame counts capture an instance of time corresponding as close as possible to when the Enhanced Continuity check Message was broadcast by the Leader VLAN Endpoint. Then, based on the continuity check schedule, the follower VLAN Endpoints will each transmit a completed ECCM message back to the Leader VLAN Endpoint (block 474). The Leader VLAN Endpoint then stores that sequence's frame count data for both the leader VLAN Endpoint and the follower VLAN Endpoints (block 456).

Returning to FIG. 4A, the method proceeds to 412 with performing a second continuity check message exchange between the first network interface device and the plurality of other network interface devices. The second continuity check message exchange comprises the first network interface collecting a second set of frame count data from each of the other network interface devices and the first network interface device. The second set of frame count data is associated with a second instance of time by a second continuity check message sequence identifier. For example, Referring to FIG. 4B, the leader VLAN Endpoint will generate a second Enhanced Continuity check Message (block 458) and populate the Enhanced Continuity check Message with frame count data from its own frame counters. This is performed immediately prior to broadcasting the second Enhanced Continuity check Message to the follower nodes over the VLAN (block 460). This Enhanced Continuity check Message will have a sequence number incremented from the ECCM of the previous exchange. Upon receiving the second Enhanced Continuity check Message (block 476), a follower VLAN Endpoint will complete the second Enhanced Continuity check Message with frame count data from its own frame counters (block 478). This is performed immediately upon receiving the second Enhanced Continuity check Message to ensure that the frame counts capture an instance of time corresponding as close as possible to when the second Enhanced Continuity check Message was broadcast by the Leader VLAN Endpoint. Then, based on the continuity check schedule, the follower VLAN Endpoints will each transmit a completed ECCM message back to the Leader VLAN Endpoint (block 480). The Leader VLAN Endpoint then stores that sequence's frame count data for both the leader VLAN Endpoint and the follower VLAN Endpoints (block 462).

Returning to FIG. 4A, the method proceeds to 414 with calculating a frame loss for the network by accounting for frame Ingress and frame Egress from the network based on the first set of frame count data and the second set of frame count data. This is illustrated in FIG. 4B where the Leader VLAN Endpoint computes a frame loss based on the frame count data (both Leader VLAN Endpoint and Follow VLAN Endpoints) collected by the first and second continuity check message exchange (block 464). The frame data collected may include Unicast, Multicast and Broadcast traffic as described above with respect to any of the Figures described herein. As such, calculating the frame loss can comprise calculating any combination of the Unicast Frame Loss, Multicast Frame Loss, Broadcast Frame Loss, and Frame Loss Ratios described above. In one or more alternative embodiments, while the leader VLAN Endpoint may collect and/or store the frame count data as described above, another device may query the leader VLAN Endpoint for the data (or otherwise receive the frame count data from the leader VLAN Endpoint) and actually perform the calculation at 414. Further, for any of the above described embodiments, should the calculation determine that a frame loss measurement exceeds a threshold acceptance criteria, a more refined frame loss detection scheme, such as a point-to-point frame loss analysis, may be initiated on the network to more specifically where on the network frame loss is occurring.

Example Embodiments

Example 1 includes a method for calculating frame loss in a multipoint network, the method comprising: performing a first continuity check message exchange between a first network interface device coupled to the multipoint network and a plurality of other network interface devices coupled to the multipoint network, wherein the first continuity check message exchange comprises the first network interface device collecting a first set of frame count data from each of the other network interface devices and the first network interface device, wherein the first set of frame count data is associated with a first instance of time by a first continuity check message sequence identifier; performing a second continuity check message exchange between the first network interface device and the plurality of other network interface devices, wherein the second continuity check message exchange comprises the first network interface collecting a second set of frame count data from each of the other network interface devices and the first network interface device, wherein the second set of frame count data is associated with a second instance of time by a second continuity check message sequence identifier; and calculating a frame loss measurement for the network by accounting for frame Ingress and frame Egress from the network based on the first set of frame count data and the second set of frame count data.

Example 2 includes the method of example 1, wherein the multipoint network is a multipoint virtual local area network (VLAN).

Example 3 includes the method of any of examples 1-2, wherein the first set of frame count data and the second set of frame count data each comprise Egress and Ingres frame counts for Unicast traffic; and wherein calculating the frame loss further comprises comparing the first set of frame count data to the second set of frame count data to determine a difference between a sum of all Unicast frame traffic which Ingressed the network and a sum of all Unicast frame traffic which Egressed the VLAN.

Example 4 includes the method of any of examples 1-3, wherein the first set of frame count data and the second set of frame count data each comprise Egress and Ingres frame counts for one or both of multicast traffic and broadcast traffic.

Example 5 includes the method of any of examples 1-4, wherein calculating the frame loss further comprises calculating a difference between a frame count of broadcast frames received at the first network interface node and frame count of broadcast frames transmitted by the plurality of other network interface devices based on broadcast traffic frame counts collected in the first set of frame count data and the second set of frame count data.

Example 6 includes the method of any of examples 1-5, wherein calculating the frame loss further comprises calculating a difference between a frame count of multicast frames received at the first network interface node and frame count of multicast frames transmitted by the plurality of other network interface devices based on multicast traffic frame counts collected in the first set of frame count data and the second set of frame count data.

Example 7 includes the method of any of examples 1-6, wherein performing the first continuity check message exchange comprises transmitting a Y.1731 standard continuity check message enhanced with a plurality of fields reserved for communicating frame count data.

Example 8 includes the method of any of examples 1-7, wherein performing the first continuity check message exchange comprises: broadcasting a first continuity check message from the first network interface device to the plurality of other network interface devices, the first continuity check message including the first continuity check message sequence identifier; wherein the first continuity check message further comprises frame count data for the first network interface device for an instance of time when the first continuity check message is transmitted.

Example 9 includes the method of any of examples 1-8, wherein performing the first continuity check message exchange further comprises: receiving at the first network interface device a first response continuity check message from each of the plurality of other network interface devices, the first response continuity check message including the first continuity check message sequence identifier and frame counts for an instance of time when the first continuity check message is received from the first network interface device.

Example 10 includes the method of any of examples 1-9, further comprising: initiating an additional frame loss analysis when the frame loss measurement exceeds a threshold value.

Example 11 includes a network interface device for determining frame loss on a multipoint network, the network interface device comprising: an interface coupled to a multipoint network that is coupled to a plurality of other network interface devices, the interface configured to exchange framed traffic with the multipoint network; a memory storing frame count data for frames transmitted and received via the interface; and a processor coupled to the interface and the memory, wherein the processor generates continuity check messages, wherein one or more fields of the continuity check messages include at least part of the frame count data from the memory; wherein the processor facilitates a frame loss measurement for the multipoint network by performing a set of continuity check message exchanges with the plurality of other network interface devices coupled to the multipoint network based on the continuity check messages generated by the processor.

Example 12 the network interface device of example 11, wherein the processor performs a first continuity check message exchange by broadcasting a first continuity check message that includes frame count data from the memory for at least one present frame count, and receiving a first plurality of completed first continuity check messages from the plurality of other network interface devices; and wherein the processor performs a second continuity check message exchange by broadcasting a second continuity check message that includes frame count data from the memory for at least one present frame count, and receiving a second plurality of completed first continuity check messages from the plurality of other network interface devices Example 13 includes a network interface device of any of examples 11-12, wherein the processor collects a set of frame count data from each of the plurality of other network interface devices for each continuity check message exchange performed; and wherein the processor calculates a frame loss measurement for the multipoint network by accounting for frame Ingress and frame Egress from the multipoint network based on a first set of frame count data from a first continuity check message exchange and a second set of frame count data from a second continuity check message exchange.

Example 14 includes a network interface device of any of examples 11-13, wherein the frame count data includes frame counts for at least one of Unicast frame traffic, Multicast frame traffic, or Broadcast frame traffic.

Example 15 includes a network interface device of any of examples 11-14, wherein the multipoint network is a multipoint virtual local area network (VLAN).

Example 16 includes a network interface device of any of examples 11-15, wherein a first set of frame count data from a first continuity check message exchange and a second set of frame count data from a second continuity check message exchange each comprise Egress and Ingres frame counts for one or both of multicast traffic and broadcast traffic.

Example 17 includes a network interface device of any of examples 11-16, wherein calculating the frame loss further comprises calculating a difference between a frame count of broadcast frames received at the interface and frame count of broadcast frames transmitted by the plurality of other network interface devices based on broadcast traffic frame counts collected in the first set of frame count data and the second set of frame count data.

Example 18 includes a network interface device of any of examples 11-17, wherein calculating the frame loss further comprises calculating a difference between a frame count of multicast frames received at the interface and frame count of multicast frames transmitted by the plurality of other network interface devices based on multicast traffic frame counts collected in the first set of frame count data and the second set of frame count data.

Example 19 includes a network interface device of any of examples 11-18, wherein the continuity check messages each comprise a Y.1731 standard continuity check message enhanced with a plurality of fields reserved for communicating frame count data.

Example 20 includes a network interface device of any of examples 11-19, wherein a first set of frame count data from a first continuity check message exchange and a second set of frame count data from a second continuity check message exchange each comprise Egress and Ingres frame counts for Unicast traffic; and wherein calculating the frame loss further comprises comparing the first set of frame count data to the second set of frame count data to determine a difference between a sum of all Unicast frame traffic which Ingressed the network and a sum of all Unicast frame traffic which Egressed the VLAN.

Several means are available to implement the embodiments of systems and methods discussed in this specification. These means include, but are not limited to, digital computer systems, embedded processors, microprocessors, general purpose computers, programmable controllers and field programmable gate arrays (FPGAs) or application-specific integrated circuits (ASICs). For example, for some embodiments, an algorithm stored in memory 148 is executed by processor 143 for performing the process described with respect to FIGS. 4A-4B or any other of the functions or calculations described herein. Therefore one or more embodiments of the present invention are program instructions resident on non-transient computer readable media which when implemented by such means enable them to implement embodiments of the present invention. Computer readable media for the memory and storage devices describe above include any form of a physical computer memory storage device. Examples of such a physical computer memory device include, but is not limited to, punch cards, firmware, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for calculating frame loss in a multipoint network, the method comprising:
   performing a first continuity check message exchange between a first network interface device coupled to the multipoint network and a plurality of other network interface devices coupled to the multipoint network, wherein the first continuity check message exchange comprises the first network interface device transmitting a first multicast continuity check message and collecting a first set of frame count data from each of the other network interface devices and the first network interface device, wherein the first set of frame count data is associated with a first instance of time by a first continuity check message sequence identifier;
   performing a second continuity check message exchange between the first network interface device and the plurality of other network interface devices, wherein the second continuity check message exchange comprises the first network interface device transmitting a second multicast continuity check message and collecting a second set of frame count data from each of the other network interface devices and the first network interface device, wherein the second set of frame count data is associated with a second instance of time by a second continuity check message sequence identifier; and
   calculating a frame loss measurement for the network by accounting for frame Ingress and frame Egress from the network based on the first set of frame count data and the second set of frame count data.

2. The method of claim 1, wherein the multipoint network is a multipoint virtual local area network (VLAN).

3. The method of claim 1, wherein the first set of frame count data and the second set of frame count data each comprise Egress and Ingres frame counts for Unicast traffic; and
   wherein calculating the frame loss further comprises comparing the first set of frame count data to the second set of frame count data to determine a difference between a sum of all Unicast frame traffic which Ingressed the network and a sum of all Unicast frame traffic which Egressed the VLAN.

4. The method of claim 1, wherein the first set of frame count data and the second set of frame count data each comprise Egress and Ingres frame counts for one or both of multicast traffic and broadcast traffic.

5. The method of claim 4, wherein calculating the frame loss further comprises calculating a difference between a frame count of broadcast frames received at the first network interface node and frame count of broadcast frames transmitted by the plurality of other network interface devices based on broadcast traffic frame counts collected in the first set of frame count data and the second set of frame count data.

6. The method of claim 4, wherein calculating the frame loss further comprises calculating a difference between a frame count of multicast frames received at the first network interface node and frame count of multicast frames transmitted by the plurality of other network interface devices based on multicast traffic frame counts collected in the first set of frame count data and the second set of frame count data.

7. The method of claim 1, wherein performing the first continuity check message exchange comprises transmitting a Y.1731 standard continuity check message enhanced with a plurality of fields reserved for communicating frame count data.

8. The method of claim 1, wherein performing the first continuity check message exchange comprises:
   broadcasting the first multicast continuity check message from the first network interface device to the plurality of other network interface devices, the first multicast continuity check message including the first continuity check message sequence identifier;
   wherein the first multicast continuity check message further comprises frame count data for the first network interface device for an instance of time when the first multicast continuity check message is transmitted.

9. The method of claim 8, wherein performing the first multicast continuity check message exchange further comprises:
   receiving at the first network interface device a first response continuity check message from each of the plurality of other network interface devices, the first response continuity check message including the first continuity check message sequence identifier and frame counts for an instance of time when the first multicast continuity check message is received from the first network interface device.

10. The method of claim 1, further comprising:
    initiating an additional frame loss analysis when the frame loss measurement exceeds a threshold value.

11. A network interface device for determining frame loss on a multipoint network, the network interface device comprising:
    an interface coupled to a multipoint network that is coupled to a plurality of other network interface devices, the interface configured to exchange framed traffic with the multipoint network;

a memory storing frame count data for frames transmitted and received via the interface; and a processor coupled to the interface and the memory, wherein the processor generates continuity check messages, wherein one or more fields of the continuity check messages include at least part of the frame count data from the memory;

wherein the processor facilitates a frame loss measurement for the multipoint network by performing a set of continuity check message exchanges with the plurality of other network interface devices coupled to the multipoint network based on the continuity check messages generated by the processor;

wherein a first continuity check message exchange comprises the processor transmitting a first multicast continuity check message and collecting a first set of frame count data for each of the plurality of other network interface devices and for the interface, wherein the first set of frame count data is associated with a first instance of time;

wherein a second continuity check message exchange comprises the processor transmitting a second multicast continuity check message and collecting a second set of frame count data for each of the plurality of other network interface devices and for the interface, wherein the second set of frame count data is associated with a second instance of time; and wherein the processor calculates a frame loss measurement for the multipoint network by accounting for frame Ingress and frame Egress from the network based on the first set of frame count data and the second set of frame count data.

12. The network interface device of claim 11, wherein the processor performs the first continuity check message exchange by broadcasting a first continuity check message that includes frame count data from the memory for at least one present frame count, and receiving a first plurality of completed first continuity check messages from the plurality of other network interface devices; and wherein the processor performs the second continuity check message exchange by broadcasting a second continuity check message that includes frame count data from the memory for at least one present frame count, and receiving a second plurality of completed first continuity check messages from the plurality of other network interface devices.

13. The network interface device of claim 12, wherein the processor collects a set of frame count data from each of the plurality of other network interface devices for each continuity check message exchange performed; and wherein the processor calculates a frame loss measurement for the multipoint network by accounting for frame Ingress and frame Egress from the multipoint network based on the first set of frame count data from the first continuity check message exchange and the second set of frame count data from the second continuity check message exchange.

14. The network interface device of claim 11, wherein the frame count data includes frame counts for at least one of Unicast frame traffic, Multicast frame traffic, or Broadcast frame traffic.

15. The network interface device of claim 11, wherein the multipoint network is a multipoint virtual local area network (VLAN).

16. The network interface device of claim 11, wherein the first set of frame count data from the first continuity check message exchange and the second set of frame count data from the second continuity check message exchange each comprise Egress and Ingres frame counts for one or both of multicast traffic and broadcast traffic.

17. The network interface device of claim 16, wherein calculating the frame loss further comprises calculating a difference between a frame count of broadcast frames received at the interface and frame count of broadcast frames transmitted by the plurality of other network interface devices based on broadcast traffic frame counts collected in the first set of frame count data and the second set of frame count data.

18. The network interface device of claim 16, wherein calculating the frame loss further comprises calculating a difference between a frame count of multicast frames received at the interface and frame count of multicast frames transmitted by the plurality of other network interface devices based on multicast traffic frame counts collected in the first set of frame count data and the second set of frame count data.

19. The network interface device of claim 11, wherein the continuity check messages each comprise a Y.1731 standard continuity check message enhanced with a plurality of fields reserved for communicating frame count data.

20. The network interface device of claim 11, wherein a first set of frame count data from a first continuity check message exchange and a second set of frame count data from a second continuity check message exchange each comprise Egress and Ingres frame counts for Unicast traffic; and wherein calculating the frame loss further comprises comparing the first set of frame count data to the second set of frame count data to determine a difference between a sum of all Unicast frame traffic which Ingressed the network and a sum of all Unicast frame traffic which Egressed the VLAN.

* * * * *